US 10,705,282 B2

(12) United States Patent
Tan et al.

(10) Patent No.: US 10,705,282 B2
(45) Date of Patent: Jul. 7, 2020

(54) BACKLIGHT MODULE COMPRISING A PLURALITY OF LIGHT EXTRACTION GRATINGS ARRANGED IN AN ARRAY ON A LIGHT EMISSION SURFACE OF A LIGHT GUIDE PLATE AND LIQUID CRYSTAL DISPLAY USING THE SAME

(71) Applicant: BOE TECHNOLOGY GROUP CO., LTD., Beijing (CN)

(72) Inventors: Jifeng Tan, Beijing (CN); Wei Wang, Beijing (CN); Xiandong Meng, Beijing (CN); Jian Gao, Beijing (CN); Wenqing Zhao, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 191 days.

(21) Appl. No.: 15/992,890

(22) Filed: May 30, 2018

(65) Prior Publication Data

US 2019/0094447 A1    Mar. 28, 2019

(30) Foreign Application Priority Data

Sep. 27, 2017 (CN) .......................... 2017 1 0889702

(51) Int. Cl.
*F21V 8/00* (2006.01)
*G02F 1/13357* (2006.01)

(52) U.S. Cl.
CPC ........... *G02B 6/0036* (2013.01); *G02B 6/002* (2013.01); *G02B 6/0016* (2013.01); *G02B 6/0018* (2013.01); *G02B 6/0031* (2013.01); *G02B 6/0033* (2013.01); *G02B 6/0035* (2013.01); *G02B 6/0043* (2013.01); *G02B 6/0063* (2013.01); *G02F 1/133605* (2013.01); *G02F 1/133611* (2013.01); *G02F 1/133615* (2013.01);

(Continued)

(58) Field of Classification Search
CPC .. G02B 6/0033; G02B 6/0063; G02B 6/0016; G02B 6/0035
See application file for complete search history.

(56) References Cited

U.S. PATENT DOCUMENTS

2003/0086030 A1*  5/2003  Taniguchi .............. G02B 6/005
                                                             349/61
2007/0058394 A1*  3/2007  Yu .......................... G02B 6/0038
                                                             362/615

(Continued)

*Primary Examiner* — Paul C Lee
(74) *Attorney, Agent, or Firm* — Calfee, Halter & Griswold LLP (57) ABSTRACT

The present disclosure provides a backlight module and a liquid crystal display using the same. The backlight module includes a light guide plate, a light source and a plurality of light extraction gratings. The light source is disposed at an end of the light guide plate. A plurality of light extraction gratings are disposed on a light emission surface of the light guide plate, and are arranged in an array. The plurality of light extraction gratings are divided into a plurality of regions arranged at equal intervals in a direction from the end of the light guide plate near the light source to another end of the light guide plate away from the of the light source, a gap between adjacent columns of two adjacent regions is a+b, where a is a gap between adjacent columns in the same region and b is a width of one light extraction grating.

13 Claims, 5 Drawing Sheets

(52) U.S. Cl.
CPC .. *G02B 6/005* (2013.01); *G02F 2001/133607* (2013.01)

(56) References Cited

U.S. PATENT DOCUMENTS

| | | | | |
|---|---|---|---|---|
| 2008/0101088 A1* | 5/2008 | Kim | G02B 6/0036 | 362/620 |
| 2008/0303180 A1* | 12/2008 | Lee | B29C 33/405 | 264/1.27 |
| 2009/0129116 A1* | 5/2009 | Kim | G02B 6/0035 | 362/606 |
| 2012/0113679 A1* | 5/2012 | Boonekamp | G02B 6/0068 | 362/607 |
| 2012/0162281 A1* | 6/2012 | Cho | G09F 13/04 | 345/690 |
| 2013/0265802 A1* | 10/2013 | Kamikatano | G09F 13/18 | 362/607 |
| 2013/0314763 A1* | 11/2013 | Wang | G02F 1/167 | 359/296 |
| 2017/0059961 A1* | 3/2017 | Park | H04N 13/305 | |
| 2017/0199317 A1* | 7/2017 | Lee | G02F 1/133504 | |
| 2017/0307800 A1* | 10/2017 | Fattal | G02B 6/0038 | |

\* cited by examiner

BACKLIGHT MODULE COMPRISING A PLURALITY OF LIGHT EXTRACTION GRATINGS ARRANGED IN AN ARRAY ON A LIGHT EMISSION SURFACE OF A LIGHT GUIDE PLATE AND LIQUID CRYSTAL DISPLAY USING THE SAME

CROSS-REFERENCE TO RELATED APPLICATIONS

The present application is based on and claims priority to Chinese Patent Application No. 201710889702.3, filed on Sep. 27, 2017, the content of which is incorporated herein by reference in its entirely.

TECHNICAL FIELD

The present disclosure relates to a backlight module and a liquid crystal display using the same.

BACKGROUND

With the continuous development of liquid crystal display technology, the application field of liquid crystal displays (LCD), especially color liquid crystal displays are constantly expended. As driven by the liquid crystal display market, the backlight source industry presents a prosperous trend.

A backlight source is a light source located behind a liquid crystal display, light-emitting effect of which will directly affect visual effect of a crystal display module (LCM). This is because the liquid crystal display itself may not emit light, and it shows a pattern as a result of its light modulation.

Therefore, the technical problem currently to be solved in the light display technical field is how to improve light intensity of the backlight source.

SUMMARY

According to a first aspect of the present disclosure, there is provided a backlight module, including a light guide plate, a light source and a plurality of light extraction gratings. The light source is disposed at an end of the light guide plate. The plurality of light extraction gratings are disposed on a light emission surface of the light guide plate, and are arranged in an array. The plurality of light extraction gratings are divided into a plurality of regions arranged at equal intervals in a direction from the end of the light guide plate near the light source to another end of the light guide plate away from the of the light source, a gap between adjacent columns of two adjacent regions is a+b, where a is a gap between adjacent columns in the same region and b is a width of one light extraction grating.

In an exemplary embodiment of the present disclosure, the backlight module further includes a flat layer covering the plurality of light extraction gratings.

In an exemplary embodiment of the present disclosure, the plurality of regions are divided into a plurality of periods in the direction from the end of the light guide plate near the light source to another end of the light guide plate away from the of the light source, diffraction efficiencies of the light extraction grating in the same period are the same.

In an exemplary embodiment of the present disclosure, diffraction efficiencies of the light extraction grating in different periods are different.

In an exemplary embodiment of the present disclosure, a width of the region is equal to a light beam diameter e of an incident light, and a number n of regions in any period is a/b, where a and b are values such that n is an integer greater than 1.

In an exemplary embodiment of the present disclosure, two columns of light extraction gratings are arranged side by side in each region.

In an exemplary embodiment of the present disclosure, connecting lines between center points of adjacent four light extraction gratings in each region form a rectangle, and another light extraction grating is also disposed on the center point of the rectangle.

In an exemplary embodiment of the present disclosure, the diffraction efficiency required for the light extraction grating in any period is calculated by the following equation:

$$1*\eta 1=\alpha$$

$$(2-\alpha)*\eta 2=\alpha$$

$$\cdots$$

$$(1-(m-1)\alpha)*\eta m=\alpha$$

where $\alpha$ is a luminous flux emitted from any light extraction grating, m is a number of the plurality of periods, and $\eta m$ is the diffraction efficiency required for the light extraction grating in the $m^{th}$ period.

In an exemplary embodiment of the present disclosure, the flat layer has a refractive index lower than that of the light guide plate.

According to another aspect of the present disclosure, there is provided a liquid crystal display including the backlight module according to any of exemplary embodiments mentioned above and a liquid crystal display panel.

The liquid crystal display panel is disposed on the backlight module, and includes:

a pixel layer disposed on the backlight module, wherein each pixel in the pixel layer is in one-to-one correspondence with each light extraction grating in the backlight module; and a color film substrate disposed on the pixel layer.

In an exemplary embodiment of the present disclosure, the pixel layer is disposed on the light extraction grating, and the color film substrate is disposed on a side of the pixel layer away from the light extraction grating.

In an exemplary embodiment of the present disclosure, a color film in the color film substrate is a quantum dot color film.

In an exemplary embodiment of the present disclosure, the liquid crystal display further comprises a mirror adjacent to the light source and the end of the light guide plate near the light source, and is configured to reflect light emitted from the light source into the light guide plate at a predetermined angle.

It should be understood that both the foregoing general description and the following detailed description are only exemplary and explanatory, and are not restrictive of the disclosure.

BRIEF DESCRIPTION OF THE DRAWINGS

The above and other objectives, features and advantages of the present disclosure will be more apparent by describing in detail exemplary embodiments thereof with reference to the accompanying drawings.

The accompanying drawings herein are incorporated in and constitute a part of this specification, illustrate embodiments consistent with the present disclosure, and serve to explain principles of the present disclosure together with the description. Obviously, the accompanying drawings in the following description are merely some embodiments of the present disclosure, and those skilled in the art can also obtain other drawings based on these drawings without any creative work.

DETAILED DESCRIPTION

Example embodiments will now be described more fully with reference to the accompanying drawings. However, example embodiments can be implemented in various forms and should not be construed as limitation to examples set forth herein; features, structures or characteristics described may be combined in one or more embodiments in any suitable manner. In the following description, various specific details are provided to provide a thorough understanding of embodiments of the present disclosure. However, those skilled in the art will recognize that technical solutions of the present disclosure may be practiced while omitting one or more of specific details, or other methods, components, devices, steps, etc. may be used.

It should be noted that, in the drawings, dimensions of layers and regions may be exaggerated for clarity of illustration. It will also be understood that when an element or layer is referred to as being "on" another element or layer, it can be directly on another element or intervening layers may be provided. In addition, it will be understood that when an element or layer is referred to as being "under" another element or layer, it can be directly under another element, more than one intervening layers or elements are provided. In addition, it will also be understood that when a layer or element is referred to as being "between" two layers or two elements, it can be the only layer between two layers or two elements, or more than one intervening layers or elements can also be provided. Similar reference numerals refer to similar elements throughout.

Figure 1:
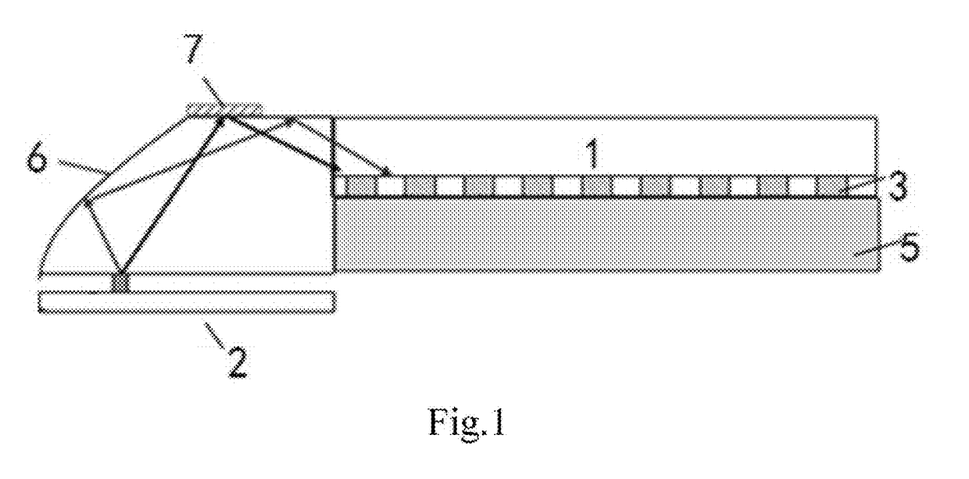
FIG. 1 shows a schematic structural view of a liquid crystal display according to an embodiment of the present disclosure.
Figure 3:
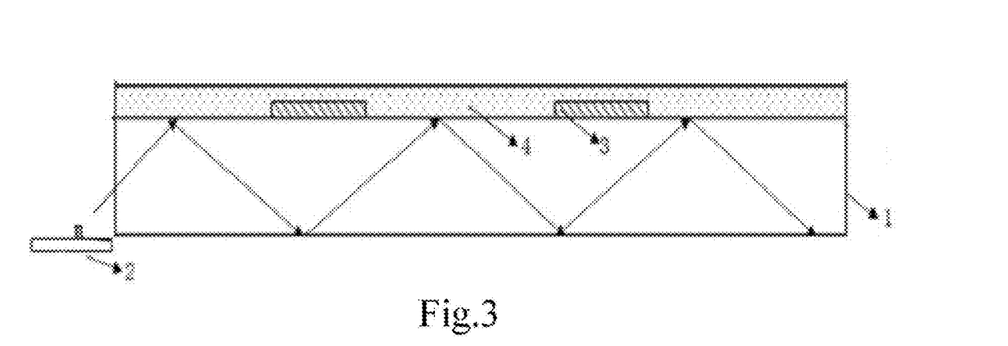
FIG. 3 shows a schematic structural view of a backlight module according to some embodiments of the present disclosure.
Figure 4:
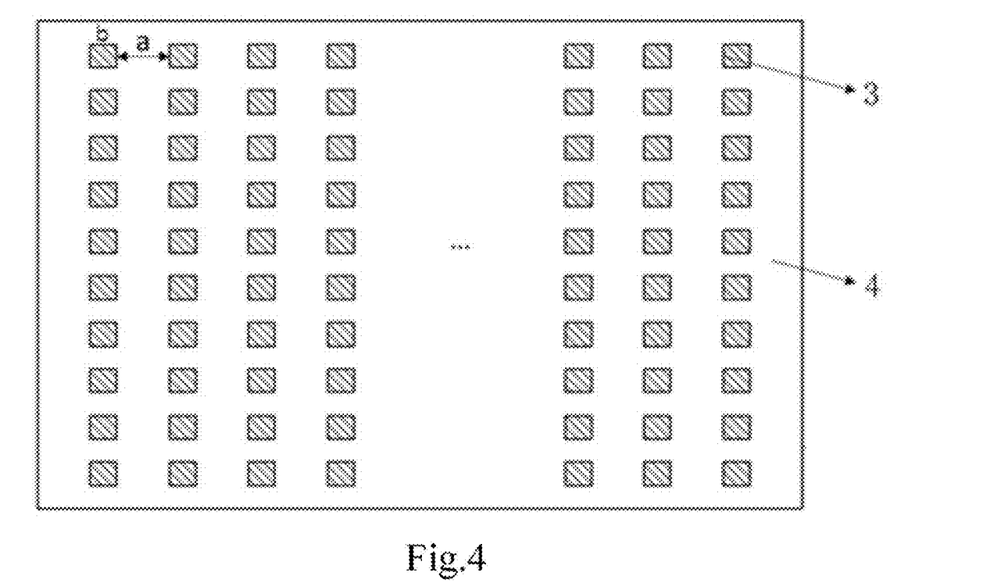
FIG. 4 shows a schematic view of arrangement of light extraction gratings in a backlight module according to an embodiment of the present disclosure.

An objective of the present disclosure is to provide a backlight module and a liquid crystal display using the same. As shown in FIGS. 1, 3 and 4, the backlight module includes: a light guide plate 1; a light source disposed at an end of the light guide plate 1; a plurality of light extraction gratings 3 disposed on a light emission surface of the light guide plate and are arranged in an array; and a flat layer 4 covering the plurality of light extraction gratings 3. The array is divided into a plurality of regions arranged at equal intervals in a direction from an end of the light guide plate 1 near the light source to an end of the light guide plate 1 away from the of the light source. A gap between adjacent columns of adjacent two regions is a+b, where a is a gap between adjacent columns in the same region, and b is a width of one light extraction grating. Each region corresponds to one light beam (light spot), and the arrangement of the light extraction gratings (i.e., light extraction port) on the light guide plate is changed into that the relative position of light extraction gratings inside apertures of adjacent light beams is displaced by a distance equal to the width of the light extraction grating, so that the light extraction gratings are reasonably distributed on the light guide plate to achieve a technical effect of greatly increasing the overall light emission intensity. At the same time, according to the pixel design of a display region, a reasonably distributed region is defined as a period, and parameters (/diffraction efficiencies) of light extraction gratings in each period are the same, while grating diffraction efficiencies in different periods are designed to achieve the technical effect of uniform light emission. In addition, the liquid crystal display according to some embodiments of the present disclosure further increases light emission intensity by proposing a design for borrowing light extraction gratings, and simultaneously increases the resolution of the liquid crystal display.

Before a detailed description of the backlight module and the liquid crystal display using the same according to the present disclosure is provided, a liquid crystal display as shown in FIG. 1 is first introduced. As shown in FIG. 1, in the liquid crystal display, light from the light source 2 such as a Lambertian light of the Led light source is condensed into the light guide plate at a large angle by a dimming grating 7. Light extraction gratings 3 are disposed on the light guide plate 1, while in other embodiments, light extraction gratings 3 may be disposed under the light guide plate 1. The function of the light extraction grating 3 is to extract a wide-angle light propagated by total reflection in the light guide plate 1 at a collimation angle to realize a high-transmittance collimated light source (which allows most of the background light passing through); then to dispose an array of light shielding layers on the light extraction grating 3 by the structure design so that the outgoing collimated light is absorbed by the light shielding layer to realize a dark state and, when a light state is displayed, a set of voltage signals are provided for the liquid crystal layer, liquid crystal forms a liquid crystal grating and different voltage signals are applied to liquid crystal as the light is emitted after being diffracted by the liquid crystal grating, thereby allowing different diffraction efficiencies of the incident light by the liquid crystal grating, and allowing multiple grayscale displays.

In the backlight source design, light extraction gratings correspond to sub-pixels displayed one by one. Considering matching between the light extraction grating and the pixel, entire light extraction gratings in one surface are arranged in an array at a certain period in the previous design. That is, since the light extraction grating is not provided on the entire surface, it is necessary to take into account the influence of the aperture ratio, which results in a very low brightness of overall light emission.

Figure 2:
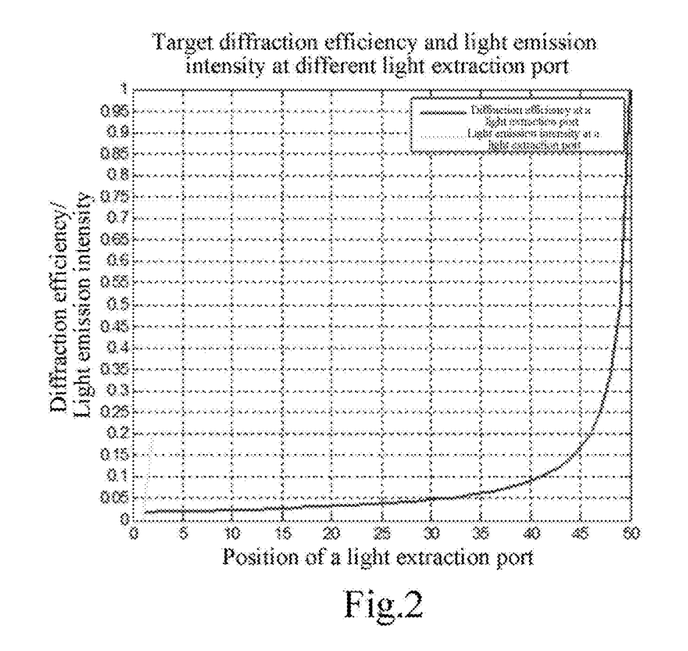
FIG. 2 shows a schematic view of grating diffraction efficiency at different positions in the liquid crystal display shown in FIG. 1.

At the same time, considering uniformity of the light emission, light emission efficiency of each of light emission ports is different. In order to achieve uniformity of light emission ports, taking 50 light emission ports as an example, the overall light emission port efficiency is less than 5% (as shown in FIG. 2). Moreover, the related gratings fabrication process may not be able to be used to fabricate a grating structure with various diffraction efficiencies.

According to the solution proposed by the present disclosure, the above problems can be solved and the technical effect of increasing light extraction efficiency can be achieved.

Figure 5:
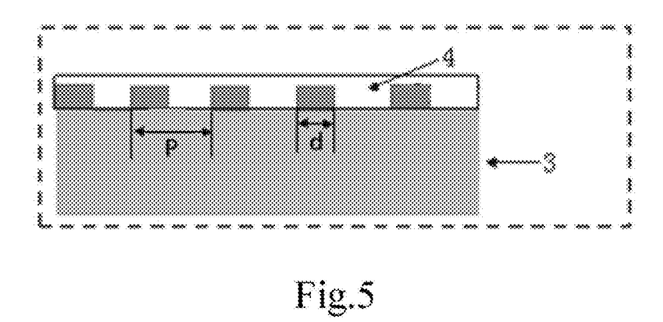
FIG. 5 shows a schematic microstructural view of a light extraction grating in a backlight module according to an embodiment of the present disclosure.
Figure 6:
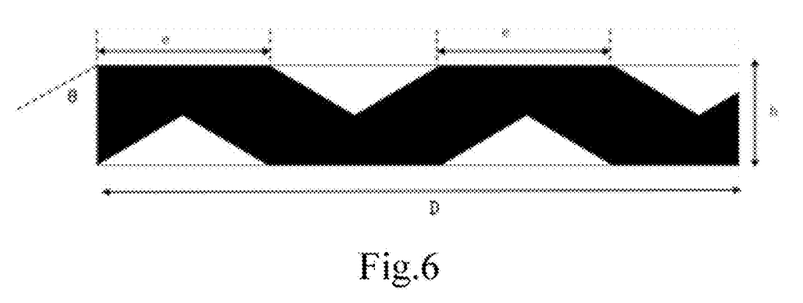
FIG. 6 shows a schematic view of geometric relationship of partition arrangement in a backlight module according to an embodiment of the present disclosure.
Figure 7:
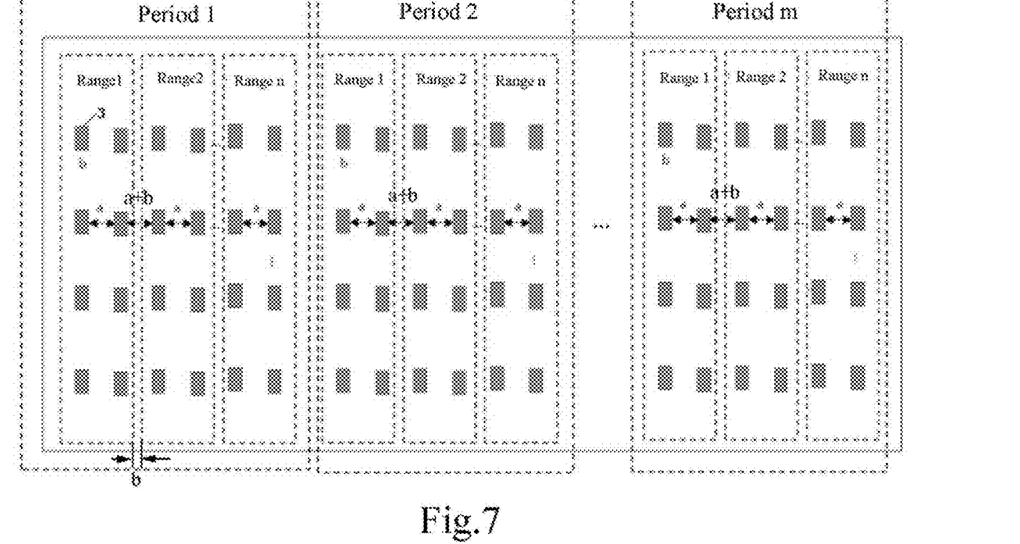
FIG. 7 shows a detailed schematic view of arrangement of light extraction gratings in a backlight module according to an embodiment of the present disclosure.
Figure 8:
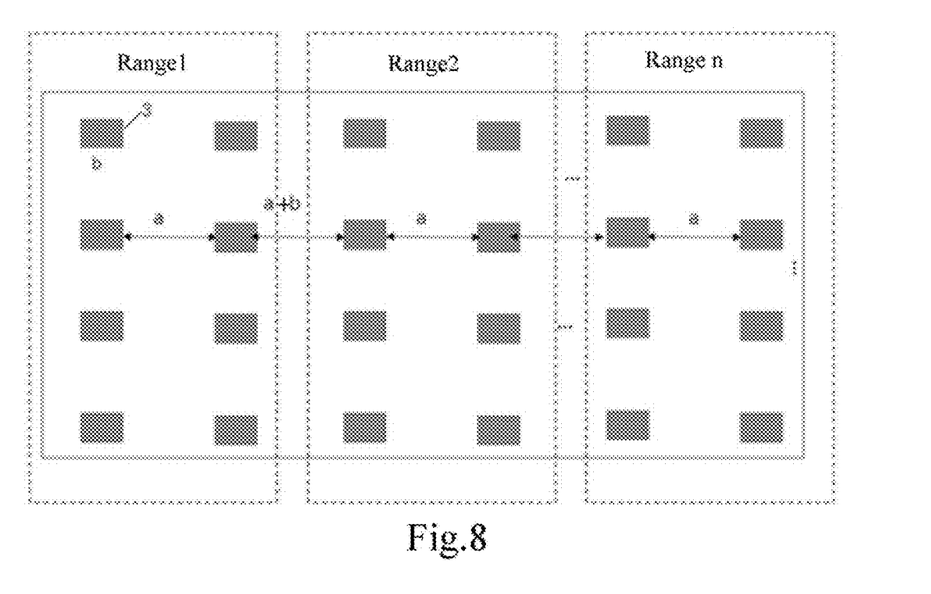
FIG. 8 shows a schematic structural view of partition arrangement of light extraction gratings in one period.
Figure 9:
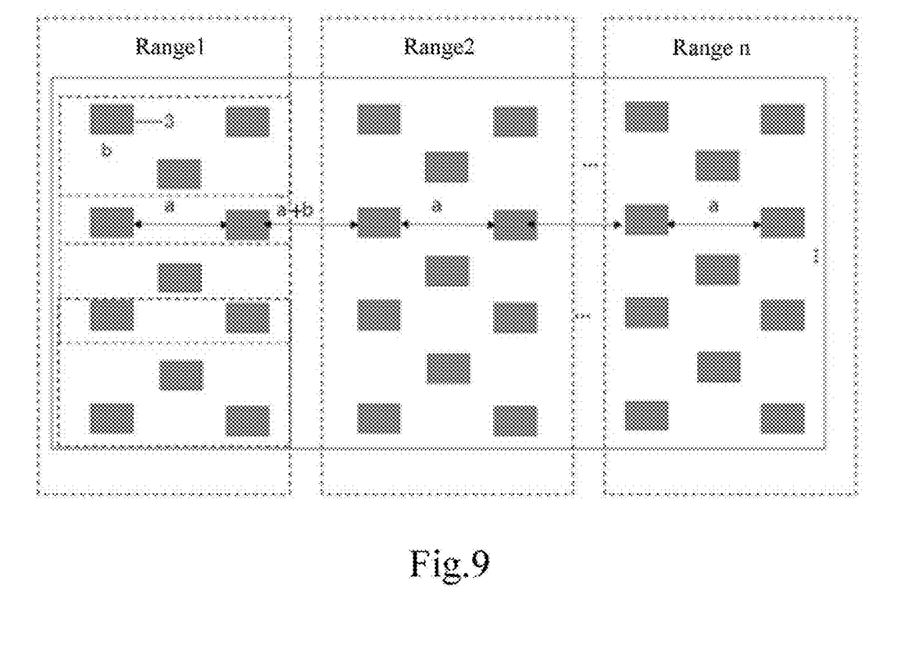
FIG. 9 shows a schematic view of arrangement of light extraction gratings in another backlight module according to an embodiment of the present disclosure.
Figure 10:
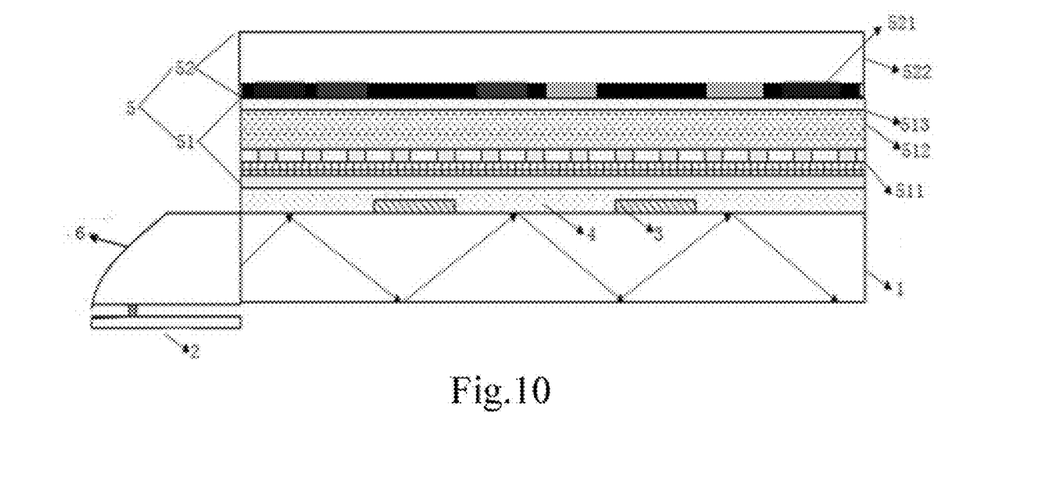
FIG. 10 shows a schematic structural view of a liquid crystal display according to an embodiment of the present disclosure.

The backlight module and the liquid crystal display using the same according to the present disclosure will be described in detail with reference to FIGS. 3 to 10, wherein FIG. 3 shows a schematic structural view of a backlight module according to an embodiment of the present disclosure; FIG. 4 shows a schematic view of arrangement of light extraction gratings in a backlight module according to an embodiment of the present disclosure; FIG. 5 shows a schematic microstructural view of a light extraction grating in a backlight module according to an embodiment of the present disclosure; FIG. 6 shows a schematic view of geometric relationship of partition arrangement in a backlight module according to an embodiment of the present disclosure; FIG. 7 shows a detailed schematic view of arrangement of light extraction gratings in a backlight module according to an embodiment of the present disclosure; FIG. 8 shows a schematic structural view of partition arrangement of light extraction gratings in one period; FIG. 9 shows a schematic view of arrangement of light extraction gratings in another backlight module according to an embodiment of the present disclosure; and FIG. 10 shows a schematic structural view of a liquid crystal display according to an embodiment of the present disclosure.

Combined with FIGS. 3, 4 and 7, the present disclosure provides a backlight module including: a light guide plate 1; a light source disposed at an end of the light guide plate 1; a plurality of light extraction gratings 3 disposed on a light emission surface of the light guide plate and are arranged in an array; and a flat layer 4 covering the plurality of light extraction gratings 3. The array is divided into a plurality of regions arranged at equal intervals in a direction from an end of the light guide plate 1 near the light source to an end of the light guide plate 1 away from the of the light source. A gap between adjacent columns of adjacent two regions is a+b, where a is a gap between adjacent columns in the same region, and b is a width of one light extraction grating.

Among them, the light guide plate 1 is used to receive light emitted by the light source, and then this part of light is propagated with total reflection in the light guide plate. The present disclosure is not limited thereto, and the light guide plate 1 may also receive light emitted by the light source and then reflected through a free-form curved mirror or other types of mirror and modulated by the dimming grating.

The light source 2 may be a monochromatic light source, such as a light emitting diode (LED), a micro LED, an organic light emitting diode (OLED), or the like.

The light extraction grating 3 is used to emit light propagated with total reflection in the light guide plate at a collimation angle to achieve the technical effect of collimated light emission. The specific structure of the light extraction grating 3 is shown in FIG. 5. A light extraction grating may include a grating structure with a plurality of periods, where p is a grating period and d is a gap between two adjacent grating slits. The grating structure may be a simple grating as shown in FIG. 5 or an echelon grating structure, and the disclosure is not limited thereto.

The flat layer 4 serves to planarize a grating layer and has a refractive index lower than the refractive index of the light guide plate, therefore a material with low refractive index (e.g. 1.25 or less) is required so that light propagated in the light guide plate is totally reflected when projected onto the flat layer without emitting out of the light extraction grating layer 2 and the flat layer and a thickness of ≥1 μm is required to ensure a larger total reflection angle in the light guide plate.

In an exemplary embodiment of the present disclosure, the plurality of regions are divided into a plurality of periods in a direction from an end of the light guide plate near the light source to an end of the light guide plate away from the of the light source. Diffraction efficiencies of the light extraction grating in the same period are the same.

In an exemplary embodiment of the present disclosure, diffraction efficiencies of the light extraction grating in different periods are different.

In an exemplary embodiment of the present disclosure, a width of the region is equal to a light beam diameter e of an incident light, and a number n of regions in any period is a/b, where a and b are values such that n is an integer greater than 1.

The arrangement of the light extraction gratings on the light guide plate is changed into that the relative position of light extraction gratings inside apertures of adjacent light beams is displaced by a distance equal to the width of the light extraction grating, so that the light extraction gratings are reasonably distributed on the light guide plate to achieve a technical effect of greatly increasing the overall light emission intensity.

The following describes in detail how to select grating parameters (the grating parameters determine the diffraction efficiency of the grating):

Referring to FIGS. 5 and 6, theoretically, the diffraction angle $\theta$ of the $m^{th}$ diffraction wave of the grating is determined only by the grating period P, the wavelength $\lambda$ of the incident wave and the incident angle $\theta 0$.

$$\sin \theta - \sin \theta 0 = m\lambda/P \ (m=0,\pm 1,\pm 2, \ldots) \quad \text{(equation 1)}$$

In general, diffraction intensities of the $0^{th}$ and $1^{st}$ diffraction of the transmission grating are relatively large, and a higher diffraction level is much smaller than that of the former two; the $0^{th}$ diffraction wave is along the direction of the incident light, and the direction of the $1^{st}$ diffraction wave can be regulated by the period of the grating. Therefore, $1^{st}$ diffraction wave is used to adjust the light angle (when the direction of light emission is equal to or close to the incident wave, the $0^{th}$ diffraction wave can also be used). When the direction of light emission is given, grating periods corresponding to different color lights is determined by equation 1. The duty cycle is generally 0.5, but it can deviate from this value in the actual product design (for example, adjusting the light emission intensity, balancing the brightness difference between different positions of the display panel, process conditions, etc.). The height of the grating, which is typically about 300 nm, can be slightly larger, such as by 1 um, or slightly smaller, such as by 200 nm. For the purpose of eliminating, weakening or enhancing the $0^{th}$ diffraction wave with a certain color light, the height of the grating can be designed for this wavelength. Since the incident angle is fixed, when a phase difference of the color wave on a grating bar and the gap is odd multiples of a half wavelength, coherence and cancellation of the $0^{th}$ diffraction wave occurs, coherence of the $0^{th}$ wave is weakened and that of 1st wave is enhanced; when the phase difference is integral multiples of the wavelength, coherence of the $0^{th}$ wave is enhanced and the $1^{st}$ wave is weakened. Different colored lights may select different or same grating heights. Simply, the light emission angle is determined by the grating period, and the duty cycle and grating height mainly affect the diffraction efficiency of the light emission angle.

As shown in FIGS. 4 and 6, b is the width of the light extraction grating, a is the gap between adjacent light extraction gratings (i.e. a gap between columns of the array aforementioned), c is a dimension of the sub-pixel of the liquid crystal display panel, D is a width of the display region, e is the light beam diameter of the incident light, f is the number of light extraction gratings within the range of one light beam diameter, and h is the thickness of the light guide plate.

The related geometric relationships are as follows:

$$e=h*\tan \theta \quad \text{(equation 2)}$$

$$f=e/c \quad \text{(equation 3)}$$

$$c=a+b \quad \text{(equation 4)}$$

According to the geometric relationship of equations 2-4, appropriate 即 values of e and f may be selected.

FIG. 8 shows a schematic structural view of partition arrangement of light extraction gratings in one period (such as $1^{st}$ period). As shown in FIG. 8, a width of regions 1 to n is e, and the number of light extraction gratings in each region is f. The width and gap of the light extraction gratings in each region are constant, and the distance between regions is b, that is, the distance between regions is equal to the size of a light extraction grating, n=a/b. n regions form a large grating array period 1, the width of which is n(e+b), and parameters of the grating within period 1 are the same as η1, i.e. the grating present the same diffraction efficiency for the incident light having the same angle and wavelength. It should be noted that the design of the liquid crystal display panel may also be changed as desire.

In one embodiment of the present disclosure, luminous flux emitted from all the light-emitting gratings in the light extraction grating layer is the same by adjusting diffraction efficiencies of the light extraction gratings in different periods. That is to say, according to the pixel design of a display region, a reasonably distributed region is defined as a period, and parameters (/diffraction efficiencies) of light extraction gratings in each period are the same, while grating diffraction efficiencies in different periods are designed to achieve the technical effect of uniform light emission.

The following describes in detail how to calculate grating diffraction efficiencies in different periods. In order to ensure luminous fluxes emitted from all the light extraction gratings as the same, the diffraction efficiency required for the light extraction grating in any period is calculated by the following equation:

$$1*\eta 1=\alpha$$

$$(3-\alpha)*\eta 2=\alpha$$

$$\ldots$$

$$(1-(m-1)\alpha)*\eta m=\alpha$$

where α is a luminous flux emitted from any light extraction grating, m is a number of the plurality of periods, and ηm is the diffraction efficiency required for the light extraction grating in the $m^{th}$ period.

In an embodiment of the present disclosure, a light extraction grating is also disposed on a center point of any rectangle in the region that takes center points of adjacent four light extraction gratings as a vertex. As shown in FIG. 9, in order to increase the overall light emission intensity, an arrangement of light extraction gratings is also provided in another dimensionality. This arrangement is suitable for a design of the liquid crystal display panel with pixel borrowed, i.e. the middle light extraction grating is shared by 4 surrounding light extraction gratings. This achieves higher light emission efficiency and also increases resolution density of the display.

Hereinafter, a liquid crystal display using the backlight module of the present disclosure will be described in detail with reference to FIG. 10. As shown in FIG. 10, the liquid crystal display of the present disclosure includes: any one of the foregoing backlight modules; and a liquid crystal display panel 5 disposed on the backlight module, wherein the liquid crystal display panel includes: a pixel layer 51 disposed on the backlight module, wherein each pixel in the pixel layer is in one-to-one correspondence with each light extraction grating in the backlight module; and a color film substrate 52 disposed on the pixel layer.

The pixel layer 51 may include a common electrode and a positive electrode layer 511, a liquid crystal layer 512, an orientation layer 513, and the like. The liquid crystal layer 512 may select from a nematic phase liquid crystal and other liquid crystals. The thickness of the liquid crystal layer 512 is 0.1-10 um to from a liquid crystal grating.

The color film substrate 52 includes a color film 521 and an upper cover plate 522.

In an exemplary embodiment of the present disclosure, the color film 521 in the color film substrate 52 is a quantum dot color film. The quantum dot color film has two functions: one is to realize colorization, in which the backlight uses a monochrome short wavelength light source to stimulate the RGB (red, green and blue) three-color quantum dots to achieve colored display; and one is to diffuse the emitted light, in which the light emitted by the present disclosure has a certain directionality and needs to be scattered, and the quantum dot color film just has a good scattering property, therefore B quantum dots also needs to be on the color film to increase the viewing angle.

In addition, in the present disclosure, it is preferable that a driving electrode and a TFT (i.e. thin film transistor) are formed on the color film because the existing nanoimprinting process can only achieve a sample production with 8 inches or less, and the array process cannot be performed after the nanoimprinting process completed. Therefore, an AOC structure is preferable, which it is not excluded that the subsequent nanoimprinting may be performed on a large substrate.

In some exemplary embodiments of the present disclosure, as shown in FIGS. 1 and 10, the liquid crystal display further includes a mirror 6 disposed at a position adjacent to the light source and simultaneously the end of the light guide plate 1 near the light source, in order to reflect the light emitted by the light source into the light guide plate at a predetermined angle. The mirror 6 can be a free-form surface mirror and this free-form surface may be paraboloid or spherical, but there is a certain included angle between a transverse axis of the surface and a horizontal direction. The included angle is less than or equal to 50°, and its function is to reflect the light after incident from the light source into a certain degree. A range of the exit angle is preferably less than 20°, but the disclosure is not limited thereto and may be greater than 20°.

From the above detailed description, those skilled in the art can easily understand that the backlight module and the liquid crystal display using the same according to the exemplary embodiment of the present disclosure have one or more of the following advantages.

According to the backlight module of some exemplary embodiments of the present disclosure, each region corresponds to a light beam, and the arrangement of the light extraction gratings on the light guide plate is changed into that the relative position of light extraction gratings inside apertures of adjacent light beams is displaced by a distance equal to the width of the light extraction grating, so that the light extraction gratings are reasonably distributed on the light guide plate to achieve a technical effect of greatly increasing the overall light emission intensity.

According to the backlight module of some exemplary embodiments of the present disclosure, at the same time, according to the pixel design of a display region, a reasonably distributed region is defined as a period, and parameters (/diffraction efficiencies) of light extraction gratings in each period are the same, while grating diffraction efficiencies in different periods are designed to achieve the technical effect of uniform light emission.

According to the liquid crystal display of some exemplary embodiments of the present disclosure, light emission intensity is further increased by proposing a design for borrowing light extraction gratings, and simultaneously the resolution of the liquid crystal display is increased.

Those skilled in the art will readily recognize other embodiments of the invention after considering the specification and practicing the invention disclosed herein. This application is intended to cover any variations, uses or adaptations of the invention, and these variations, uses or adaptations of the invention follow the general principles of the invention and include any common knowledge or conventional techniques that are not disclosed in the technical field of the invention. The description and examples are to be considered exemplary only, with the true scope and spirit of the invention being indicated by the following claims.

It should be understood that the present invention is not limited to the precise structure that has been described above and shown in the drawings, and various modifications and changes can be made without departing from the scope thereof. The scope of the present invention is limited only by the attached claims.

What is claimed is:

1. A backlight module, comprising:
   a light guide plate;
   a light source, disposed at an end of the light guide plate; and
   a plurality of light extraction gratings, disposed on a light emission surface of the light guide plate, and arranged in an array; wherein
   the plurality of light extraction gratings are divided into a plurality of regions arranged at equal intervals in a direction from the end of the light guide plate near the light source to another end of the light guide plate away from the of the light source, a gap between adjacent columns of two adjacent regions is a+b, where a is a gap between adjacent columns in a same region and b is a width of one light extraction grating.

2. The backlight module according to claim 1, further comprising a flat layer covering the plurality of light extraction gratings.

3. The backlight module according to claim 2, wherein the plurality of regions are divided into a plurality of periods in the direction from the end of the light guide plate near the light source to another end of the light guide plate away from the of the light source, diffraction efficiencies of the light extraction grating in the same period are the same.

4. The backlight module according to claim 3, wherein diffraction efficiencies of the light extraction grating in different periods are different.

5. The backlight module according to claim 2, wherein a width of the region is equal to a light beam diameter e of an incident light, and a number n of regions in any period is a/b, where a and b are values such that n is an integer greater than 1.

6. The backlight module according to claim 2, wherein two columns of light extraction gratings are arranged side by side in each region.

7. The backlight module according to claim 2, wherein connecting lines between center points of adjacent four light extraction gratings in each region form a rectangle, and another light extraction grating is also disposed on the center point of the rectangle.

8. The backlight module according to claim 3, wherein the diffraction efficiency required for the light extraction grating in any period is calculated by the following equation:

$$1*\eta 1=\alpha$$

$$(2-\alpha)*\eta 2=\alpha$$

$$(1-(m-1)\alpha)*\eta m=\alpha$$

where a is a luminous flux emitted from any light extraction grating, m is a number of the plurality of periods, and $\eta m$ is the diffraction efficiency required for the light extraction grating in the $m^{th}$ period.

9. The backlight module according to claim 2, wherein the flat layer has a refractive index lower than that of the light guide plate.

10. A liquid crystal display, comprising:
    the backlight module according to claim 1; and
    a liquid crystal display panel; wherein
    the liquid crystal display panel is disposed on the backlight module, and comprises:
    a pixel layer disposed on the backlight module, wherein each pixel in the pixel layer is in one-to-one correspondence with each light extraction grating in the backlight module; and
    a color film substrate disposed on the pixel layer.

11. The liquid crystal display according claim 10, wherein the pixel layer is disposed on the light extraction grating, and the color film substrate is disposed on a side of the pixel layer away from the light extraction grating.

12. The liquid crystal display according claim 10, wherein a color film in the color film substrate is a quantum dot color film.

13. The liquid crystal display according claim 10, further comprising a mirror adjacent to the light source and the end of the light guide plate near the light source, and configured to reflect light emitted from the light source into the light guide plate at a predetermined angle.

* * * * *